United States Patent [19]

Marcucci et al.

[11] Patent Number: 4,585,468
[45] Date of Patent: Apr. 29, 1986

[54] APPARATUS FOR MANUFACTURING A DISCHARGE LAMP ENVELOPE HAVING MULTIPLE CONSTRICTIONS

[75] Inventors: Rudolph V. Marcucci, Beverly; Robert Y. Pai, Hamilton, both of Mass.

[73] Assignee: GTE Products Corporation, Stamford, Conn.

[21] Appl. No.: 678,957

[22] Filed: Dec. 6, 1984

[51] Int. Cl.⁴ ............................................. C03B 27/04
[52] U.S. Cl. ........................................ 65/277; 65/292; 65/295
[58] Field of Search ................... 65/109, 110, 138, 156, 65/255, 276, 277, 281, 282, 292, 293, 294, 295, 279

[56] References Cited

U.S. PATENT DOCUMENTS

| | | | |
|---|---|---|---|
| 2,916,645 | 12/1959 | Lemmers et al. | 313/109 |
| 2,973,447 | 2/1961 | Aicher et al. | 313/109 |
| 3,098,945 | 7/1963 | Lemmers | 313/109 |
| 3,759,682 | 9/1973 | Tiley | 65/109 |
| 3,897,233 | 7/1975 | Szligay | 65/109 |
| 3,988,633 | 10/1976 | Shurgan | 313/493 |
| 4,514,206 | 4/1985 | Roselt et al. | 65/108 |

FOREIGN PATENT DOCUMENTS

| | | | |
|---|---|---|---|
| 4949168 | 12/1974 | Japan | 65/109 |
| 130166 | 6/1958 | U.S.S.R. | 65/110 |

Primary Examiner—Robert Lindsay
Attorney, Agent, or Firm—Carlo S. Bessone

[57] ABSTRACT

An apparatus for manufacturing a fluorescent lamp envelope comprises means for holding the envelope, a plurality of heat sources, means for providing relative rotation between the envelope and the plurality of heat sources with the heat therefrom acting on substantially narrow axially spaced regions on the envelope, means for engaging the envelope and for forming a plurality of constricting portions at axially spaced regions on the envelope, means for moving the forming means to engage the envelope and means for applying a positive pressure within the envelope while the forming means is engaged with the envelope.

6 Claims, 7 Drawing Figures

APPARATUS FOR MANUFACTURING A DISCHARGE LAMP ENVELOPE HAVING MULTIPLE CONSTRICTIONS

CROSS-REFERENCE TO RELATED APPLICATIONS

This application discloses subject matter related to that in Ser. Nos. 689,959; 678,958; 678,928; 678,929; and 678,930 filed concurrently herewith, and assigned to the Assignee of this application, but does not claim the inventions claimed in such related applications.

BACKGROUND OF THE INVENTION

This invention relates in general to apparatus for manufacturing low pressure arc discharge lamps and more particularly to apparatus for manufacturing the envelope of a compact fluorescent lamp having an increased voltage drop thereacross.

It is often desirable to substantially increase the voltage drop in a low pressure mercury discharge lamp without decreasing the efficiency of the discharge in producing UV radiation. This is especially true when it is desirable to keep the arc length of the lamp as short as possible and consequently minimize the overall physical dimensions of the lamp which maintaining the same light output. This is especially important in the case of compact fluorescent lamps.

It is known in the art that the voltage across an arc discharge lamp can be increased to obtain more radiation by varying the operating parameters of the discharge lamp, such as the lamp current loading, pressure, etc. However, altering these parameters affects the performance or some other aspect of the discharge lamp. It is known that increasing the lamp power by increasing the lamp current loading will result in more radiation in a given lamp length. Increasing the lamp power to more than a given valve results in a decrease in the conversion efficiency of the electrical energy supplied to the lamp into useful radiation. Also, the circuit losses in the stabilizing choke increase with the increased lamp current.

Fluorescent lamps have been made in the past which attempt to increase the voltage drop across the lamp by means of indentations or grooves in the envelope. Examples of such lamps having a plurality of individual indentations formed in a periodic manner along the envelope to increase the effective arc stream length are shown in U.S. Pat. Nos. 2,916,645; 2,973,447; and 3,098,945. These configurated lamps which have elongated tubular envelopes with non-circular cross-sections are generally complicated and consequently rather expensive to manufacture.

Another lamp is shown in U.S. Pat. No. 3,988,633 in which a plurality of separate and continuous grooves are used to increase the radiation of the lamp by altering the wall recombination rate of the plasma ions with the phosphor. The additional voltage generated in this type of lamp is not substantial i.e., less than 1 volt per inch of arc length.

BRIEF SUMMARY OF THE DISCLOSURE

It is, therefore, an object of this invention to obviate the disadvantages of the prior art.

It is a more particular object of this invention to provide a novel apparatus for manufacturing a low pressure arc discharge lamp envelope having means for providing a significantly increased voltage drop across the lamp.

It is a further object of this invention to provide a novel apparatus for manufacturing a fluorescent lamp envelope having a plurality of constricting portions axially spaced apart and extending about the periphery thereof.

These objects are accomplished, in one aspect of the invention, by the provision of an apparatus for manufacturing a lamp envelope having a plurality of constricting portions axially spaced apart for constricting the plasma discharge in order to provide an increase in the lamp voltage. The apparatus comprises means for holding the envelope, a plurality of heat sources, means for providing relative rotation between the envelope and the plurality of heat sources with the heat therefrom acting on substantially narrow axially spaced regions on the envelope, means for engaging the envelope and for forming the plurality of constricting portions at the axially spaced regions on the envelope, means for moving the forming means to engage the envelope and means for applying a positive pressure within the envelope while the forming means is engaged with the envelope.

DETAILED DESCRIPTION OF PREFERRED EMBODIMENTS

For a better understanding of the present invention, together with other and further objects, advantages, and capabilities thereof, reference is made to the following disclosure and appended claims taken in conjunction with the above described drawings.

Figure 1:
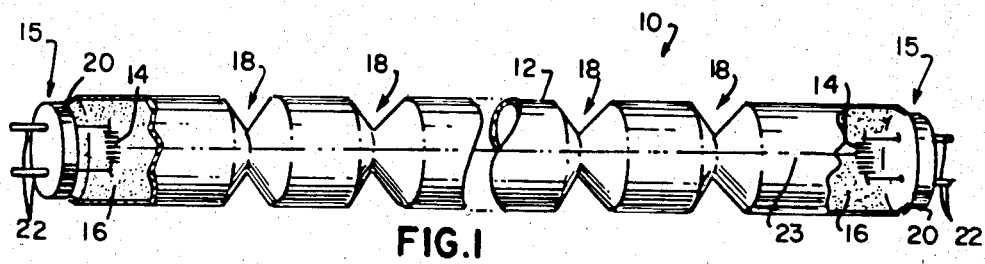
FIG. 1 is a perspective view of a lamp manufactured by apparatus according to the invention.

Referring now to the drawings with greater particularly, FIG. 1 shows a fluorescent lamp 10 made from the apparatus according to the invention. Lamp 10 includes an envelope 12 of substantially circular configuration in cross-section which is generally made of light-transmitting soda-lime or lead glass. Envelope 12 contains two axially opposed end portions 15. An electrode 14 is located within a respective one of the axially opposed end portions 15 of envelope 12. At least one phosphor layer 16 is positioned on the interior surface of envelope 12. Envelope 12 encloses an ionizable medium including a quantity of mercury and an inert starting gas. The gas may consist of argon, neon, helium, etc., or a combination thereof at a low pressure in the range of about 1 to 4 mmHg. Lamp 10 has an end cap 20 with corresponding electrical terminals 22 attached at each end. Although an end cap 20 with a pair of terminals 22 is shown, the present invention is also applicable to other end cap types, for example single pin or recessed pins. An arc length axis 23 is defined by an imaginary line extending from one electrode to the other electrode passing through the cross-sectional midpoint of the entire envelope.

Figure 2:
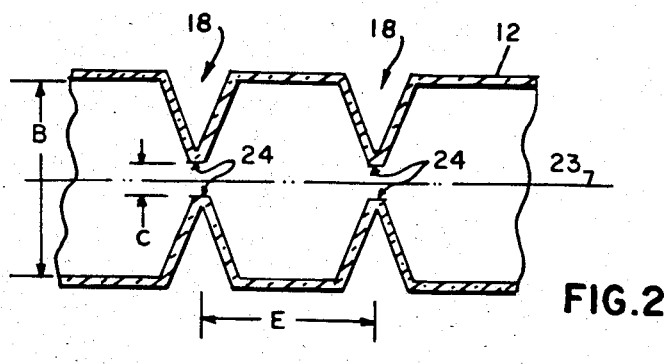
FIG. 2 is a partial longitudinal cross-sectional view of the lamp of FIG. 1.

Envelope 12 includes a plurality of constricting portions 18, axially spaced apart and extending substantially about the periphery of the envelope 12. It is not necessary for constricting portion 18 to extend completely around envelope 12. Each of the constricting portions 18 as shown in the partial cross-sectional views of FIGS. 2 and 3, contains a defined end segment 24 projecting within the envelope 12. End segment 24 is that section of constricting portion 18 which deviates from the angle of the side walls 26. The cross-section of end segment 24 need not have a flat surface (as shown for 24) but may have a curved or bowed surface, illustrated as 24'.

Theoretically, the length A of end segment 24 should not be more than the electron energy relaxation distance $d_r$ for the conditions of the discharge within the lamp (i.e., gas type, gas pressure, electron temperature, etc.) The electron energy relaxation distance $d_r$ is a well known quantity which, in a low pressure positive column discharge, is defined by the equation:

$$d_r^{-1} = [(3P_{Hg}Q_{in}^{Hg} + 3P_R Q_{in}^R)(P_{Hg}Q^{Hg} + P_R Q^R)]^{\frac{1}{2}}$$

where
$P_{Hg}$ is the mercury number density in the vapor
$P_R$ is the rare gas number density
$Q_{in}^{Hg}$ is the total inelastic scattering cross-section for the electrons by Hg.
$Q_{in}^R$ is that total inelastic scattering cross-section for the electrons by gas
$Q^{Hg}$ is the total elastic scattering cross-section for electrons by Hg.
$Q^R$ is the total elastic scattering cross-section for electrons by gas.

Since electron energy relaxation is known to be a continuously occurring process, the length A is not expected to be exactly $d_r$. Empirically, the length A of the end segment 24 can be within the range of from about 0.02 to 1 times the electron energy relaxation distance $d_r$. Generally A is within the range of from about 0.1 millimeter to about 2.0 millimeters. For example, for a neon fill gas at a pressure of 2 torr at 25° C., $d_r$ equals approximately 5 mm; for argon at a pressure of 2 torr at 25° C., $d_r$ equals approximately 1.5 mm.

In a preferred lamp made by apparatus according to the invention, constricting portions 18 are all of substantially uniform depth and shape and are spaced apart equally by a separation distance E. The distance E is measured axially within the envelope between the midpoints of the end segments of a pair of adjacent constricting portions. Changing the value E effects both the voltage generated across the lamp and also the efficiency of light generated. It has been found that E should be equal to at least the difference between the maximum internal diameter B and the minimum internal diameter C of the envelope for proper relaxation of the plasma discharge. Typical values for the separation distance are within the range of from about 25 millimeters to about 100 millimeters.

Significant increases in lamp voltage can be achieved when the ratio of the maximum internal diameter of the envelope to the minimum internal diameter is within a range of ratios B:C of about 2:1 to 10:1 or greater. At the same time, the length A should not be more than the electron energy relaxation distance $d_r$ of the lamp.

Figure 3:
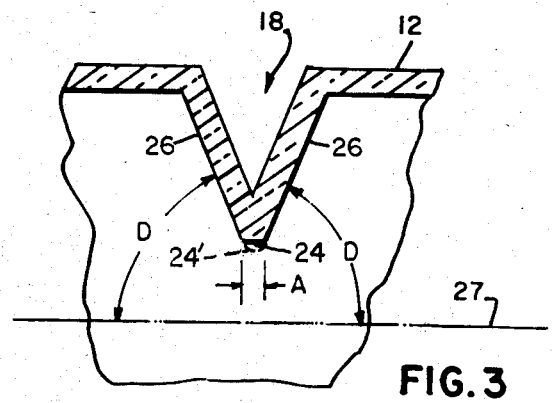
FIG. 3 is an enlarged partial cross-sectional view of the lamp of FIG. 1.

As best shown in the enlarged partial cross-sectional view of FIG. 3, the cross-sectional shape of each constricting portion 18 of envelope 12 preferably is substantially in the form of a V having an end segment 24 and a pair of opposed sidewalls 26. Constricting portion 18 is preferably symmetrical about its center line; or in other words, each of the sidewalls 26 forms the same angle D with an imaginary line 27 parallel to the arc length axis 23. Preferably the sidewall angle D is within the range of from about 45 degrees to about 90 degrees.

In one example of a fluorescent lamp made from the apparatus in accordance with the invention, the envelope 12 was made of T17 size having a maximum internal diameter B equal to about 52 mm. Three constricting portions were formed in the envelope having a separation distance E equal to about 50 mm, an axial end segment length A of approximately 1 mm, and a minimum internal envelope diameter C of 6 mm and sidewall angle D of 45°. The resulting ratio B:C was equal to 8.7:1. The fill gas used was 100 percent neon at a pressure of about 2.0 mmHg.

The following table shows the electrical parameters measured for both the above mentioned constricted lamp along with a control lamp (a similar T17 lamp without constricting portions) operating on a 120 volt, 60 cycle lag-type circuit. The arc length in both lamps was approximately 120 mm.

|         | Control Lamp | Constricted Lamp |
|---------|--------------|------------------|
| Volts   | 23.0         | 53.0             |
| Amperes | .450         | .460             |
| Watts   | 10.0         | 23.0             |
| Lumens  | 410          | 1000             |

The above table shows an increase in both lamp voltage and wattage for the constricted lamp. The constricted lamp yielded approximately 10 volts for each constriction.

The exact dependence of the increase in voltage on the parameters A,B,C,D and E are difficult to calculate due to the presence of many different interrelated processes which contribute to the discharge. However, certain general empirical relations can be made. Increases in the voltage per constriction were directly proportional to increases in the ratio B:C, the sidewall angle D, or the separation distance E.

Although the specific values of the voltage per constriction may vary for different values of the parameters A,B,C,D and E, a general trend in which a B:C constriction ratio of 2:1 to 3:1 yields a voltage per constriction of about 6 volts has been observed in other examples. The values in examples used for A were 1 mm to 2 mm; for B were 35 mm to 64 mm; for C were 3 mm to 15 mm; for D were 45° to 90°; for E were 25 mm to 40 mm. A neon gas fill of 2 torr and mercury vapor density appropriate for 25° C. to 50° C. were used.

Figure 4:
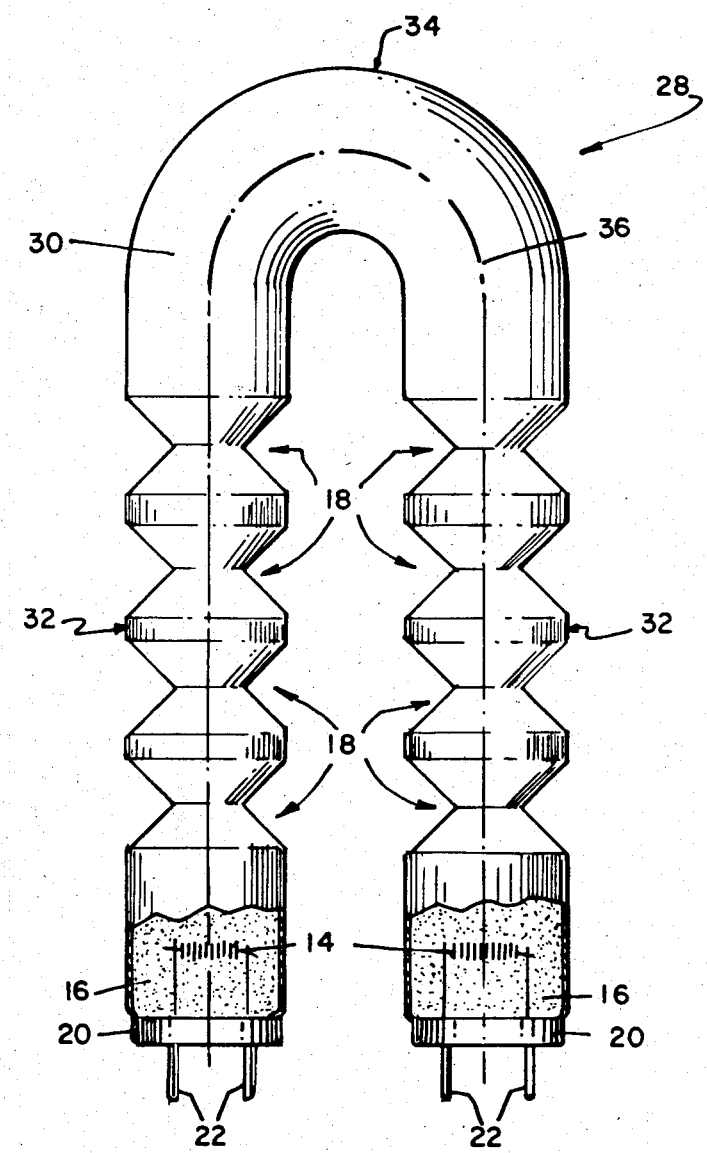
FIG. 4 is a plan view of a U-lamp manufactured by apparatus according to the invention.

FIG. 4 shows another lamp made from the apparatus of the invention. Lamp 28 comprises an envelope 30 of a U-shaped configuration having an axially curved portion 34 and a pair of leg portions 32. At least one phosphor layer 16 is positioned on the interior surface of envelope 30. An electrode 14 is located within each of the end portions of the envelope 30. Envelope 30 encloses an ionizable medium including a quantity of mercury and an inert starting gas. Lamp 28 has an end cap 20 with corresponding electrical terminals 22 attached at each end. The leg portions 32 of the envelope 30 include a plurality of constricting portions 18 made by the apparatus according to the invention, and the curved portion 34 contains no constricting portions.

As an example of a U-shaped fluorescent lamp made from the apparatus in accordance with the invention, a 254 mm arc length T8 lamp was made with 8 constricting portions (4 in each leg portion). The maximum internal diameter B was equal to about 23.4 mm. The separation distance E equaled about .19 mm, the axial end segment length A was approx. 1 mm; and the envelope minimum internal diameter C was 9.5 mm and the sidewall angle D was 45°. The resulting ratio B:C was equal to about 2.5:1. The lamp contained 100% neon fill gas at 2 mmHg.

The following table shows the electrical and photometric parameters of the above described U-shaped lamp and a control U-shaped lamp (without constrictions) operating on a 120 volt, 60 cycle lag-type circuit;

|         | Control Lamp | Constricted Lamp |
|---------|--------------|------------------|
| Volts   | 50.0         | 60.0             |
| Amperes | .350         | .350             |
| Watts   | 15.0         | 19.0             |
| Lumens  | 800          | 1100             |

The manufacture of an envelope with constrictions of the form as described may be accomplished by heating an envelope of round cross-sectional configuration to the softening point of the glass. While the envelope is under pressure, the constrictions are pressed into the envelope wall by a mold. Alternatively, the constrictions can be formed by a ribbon machine type operation in which the heated envelope is blown into shape within a mold.

Figure 5:
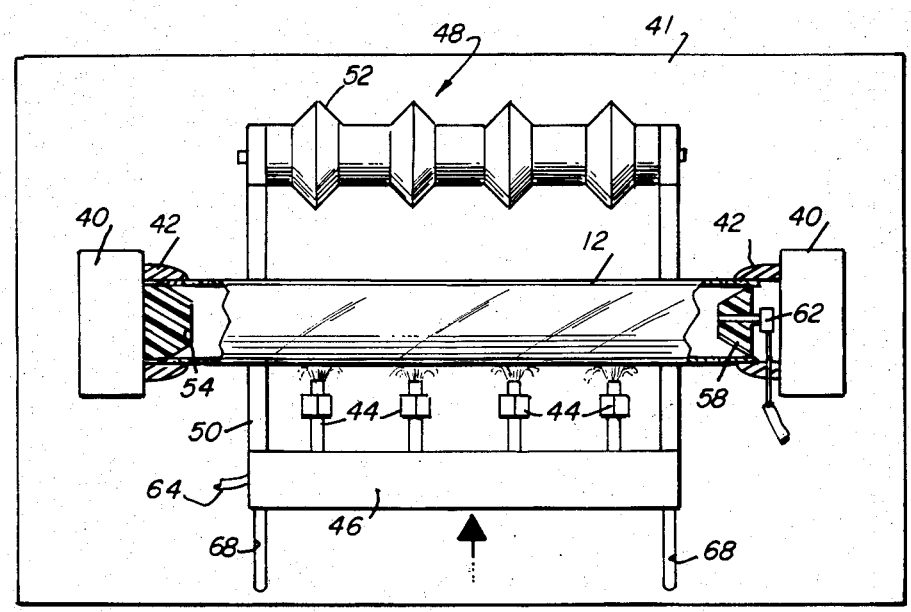
FIG. 5 is a top plan view of the apparatus for making the lamps according to the invention during the heating of the envelope.
Figure 6:
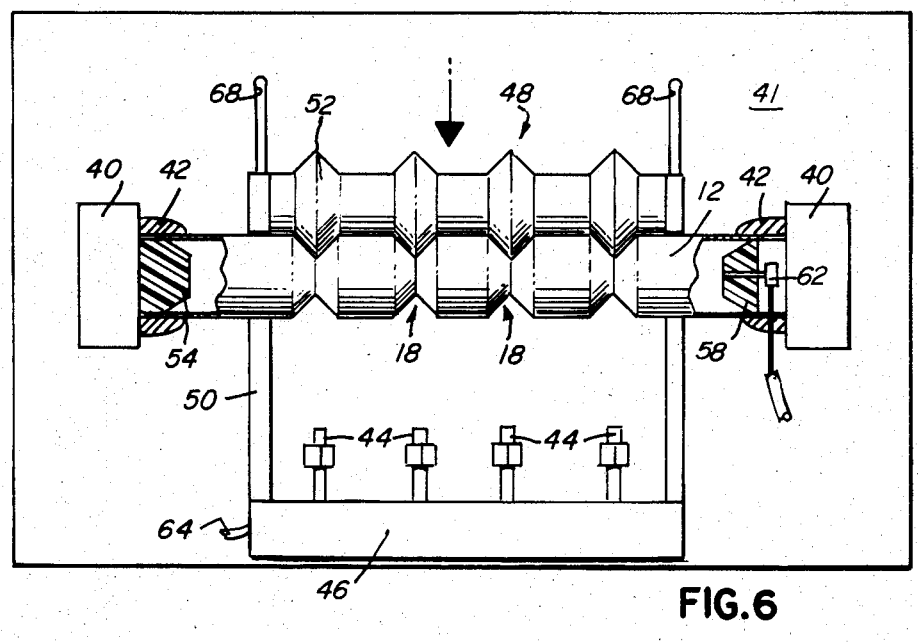
FIG. 6 is a top plan view of the apparatus for making the lamps according to the invention during the forming of the envelope.
Figure 7:
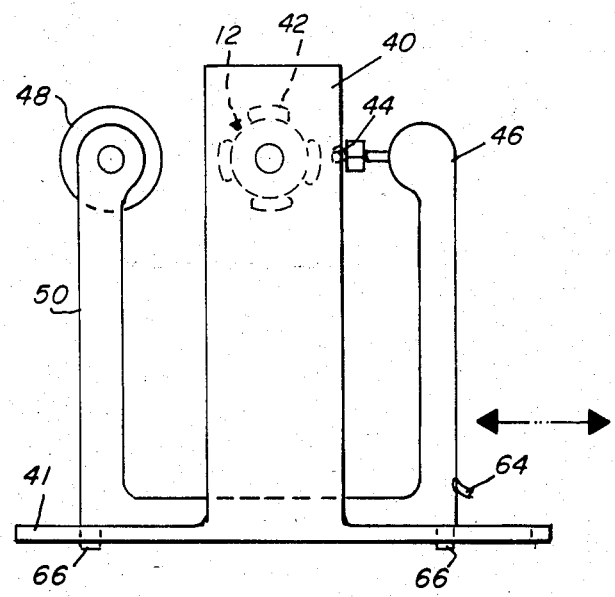
FIG. 7 is a side plan view of the apparatus for making the lamps according to the invention.

FIGS. 5, 6 and 7 shows one type of apparatus for manufacturing the lamp of FIGS. 1 and 4. The envelope 12 is held in a place for example by chucks 42 between the end plates of a conventional glass lathe 40 mounted on platform 41. A plurality of heat sources, such as gas burners 44, are mounted on a manifold 46 with manifold intake 64. Burners 44 are spaced apart by the distance desired between the constricting portions 18. The burners 44 have nozzles which cause the flames to heat substantially narrow regions on the envelope 12. The width of the heated region should be approximately equal to the longitudinal width of the desired constricting portion.

In one embodiment of the invention, lathe 40 rotates the envelope 12 with respect to gas burners 44. It is also possible to have the gas burners 44 rotating around a stationary envelope.

In order to form constricting portions having the desired shape, a means for engaging the envelope and for forming the constricting portions is provided, for example by a forming tool 48. The forming tool 48 in a preferred embodiment of the invention comprises a rotatable, substantially cylindrical tool which has a plurality of protrusions 52 extending substantially about the periphery of the forming tool 48. The outwardly projecting protrusions 52 have a cross-sectional shape substantially equal to the predetermined shape of the desired constricting portions 18. The forming tool can also be made so that it does not rotate. In either case, the forming tool is made of carbon, copper or any other suitable material.

In the preferred embodiment a structural means, such as a carriage 50, attaches the manifold 46 to the forming tool 48. The carriage 50 is allowed to move in a direction normal to the longitudinal axis of the envelope. For example, movement of the carriage as shown in FIG. 6 in a direction to permit the engagement of the forming tool 48 to the envelope 12 causes the movement of the gas burners away from the envelope 12. The carriage 50 has guide pins 66 to ride in guides 68.

In operation, the fires produced by burners 44 are advanced toward the envelope 12 as shown in FIG. 5 to the extend needed to produce heating of substantially narrow regions along the rotating envelope 12. The narrow regions are heated for a period of time sufficient to cause softening of the envelope. Forming tool 48 is then moved by moving carriage 50 by hand or by means of a programmable motor in a direction normal to the longitudinal axis of envelope 12 to engage the rotating envelope as shown in FIG. 6. Friction caused by the engagement of the rotating envelope 12 to the forming tool 48 causes the forming tool 48 to rotate in a direction opposite to that of the envelope 12. The carriage 50 is moved until the protrusions 52 on forming tool 48 have produced the desired shape and depth of the constrictions in envelope 12.

It is important at the time of forming to maintain a gas pressure inside the envelope 12 that is slightly positive with respect to the air pressure outside the envelope. The internal pressure prevents collapse of the glass due to glass surface tension as well as the pressure of the forming tool 48 against the envelope. As the envelope 12 is rotated, the internal pressure presses the envelope against protrusions 52 of the forming tool 48 and ensures that the envelope in the heated regions conforms to the shape of the forming tool 48.

A positive pressure can be applied within the envelope 12 through a swivel 62 inserted through a hole in rubber stopper 58 which seals one end of envelope 12. The other end of envelope 12 is sealed by rubber stopper 54. A slight internal pressure of approximately 1 p.s.i. is maintained during the forming of constrictions 18.

FIG. 7 shows a side plan view of the apparatus according to the invention which includes lathe 40 platform 41, manifold 46 manifold intake 64, gas burner 44, forming tool 48 carriage 50, chucks 42, envelope 12 and guide pins 66.

The constricting portions shown in the U-lamp 28 in FIG. 4 can also be made using the apparatus according to the invention. In this case the constricting portions 18 are made in the envelope 30 before the curved portion 34 is formed.

After the glass envelope is formed, the remaining steps for making a complete fluorescent, low pressure discharge lamp are identical to those for conventional lamps. Due to the relatively large opening at each constriction, a normal phosphor coating process, such as application of a slurry of phosphor in an organic or water base, can be used. The phosphor coated envelope is then processed into a fluorescent lamp in the usual conventional manner.

While there have been shown what are at present considered to be preferred embodiments of the invention, it will be apparent to those skilled in the art that various changes and modifications can be made herein without departing from the scope of the invention as defined by the appended claims.

We claim:

1. Apparatus for manufacturing a fluorescent lamp envelope of substantially round configuration in cross-section and having a plurality of constricting portions each having a predetermined cross-sectional shape and being axially shaped apart and extending substantially about the circular periphery of said envelope and projecting therein, said apparatus comprising:
   means for holding said envelope;
   a plurality of heat sources;
   means for providing relative rotation between said envelope and said plurality of heat sources with the heat therefrom acting on substantially narrow axially spaced regions on said envelope;
   means for engaging said envelope and for forming said plurality of constricting portions at said axially spaced regions on said envelope, said forming means comprises a forming tool having a plurality of protrusions axially spaced apart and extending outwardly from said forming tool, said protrusions having a cross-sectional shape substantially equal to said predetermined cross-sectional shape of said constricting portions;
   means for moving said forming means in a direction normal to said envelope to engage said envelope;
   means for applying a positive pressure within said envelope while said forming means is engaged with said envelope.

2. The apparatus of claim 1 wherein said means for providing relative rotation allows said envelope to rotate with respect to said plurality of heat sources.

3. The apparatus of claim 1 wherein said forming means comprises a rotatable substantially cylindrical forming tool having a plurality of protrusions extending substantially about the periphery of said forming tool and projecting outwardly therefrom, each of said protrusions having a cross-sectional shape substantially equal to said predetermined shape of said constricting portions.

4. The apparatus of claim 3 or 4 wherein said forming tool is made from a group of materials consisting of carbon and copper.

5. The apparatus of claim 1 further comprising structural means coupling said plurality of heat sources to said forming means.

6. The apparatus of claim 5 wherein said structural means comprises a carriage, said carriage capable of moving in a direction normal to the longitudinal axis of said envelope.

* * * * *